United States Patent
Key et al.

(10) Patent No.: US 6,179,214 B1
(45) Date of Patent: Jan. 30, 2001

(54) PORTABLE PLUG-IN CONTROL MODULE FOR USE WITH THE SERVICE MODULES OF HVAC SYSTEMS

(75) Inventors: Brian Jeffrey Key, Chittenango, NY (US); Alan Jay Fuller, Houston, TX (US); Timothy Dale McCaslin, Eaton, NY (US)

(73) Assignee: Carrier Corporation, Farmington, CT (US)

(*) Notice: Under 35 U.S.C. 154(b), the term of this patent shall be extended for 0 days.

(21) Appl. No.: 09/358,195

(22) Filed: Jul. 21, 1999

(51) Int. Cl.$^7$ .................................................. G05D 23/00
(52) U.S. Cl. ............................... 236/51; 62/127; 165/11.1
(58) Field of Search .......................... 236/51, 94; 62/125, 62/126, 127, 129, 130; 165/11.1, 11.2

(56) References Cited

U.S. PATENT DOCUMENTS

| | | | | |
|---|---|---|---|---|
| 4,146,085 | * | 3/1979 | Wills | 165/11 |
| 4,287,939 | * | 9/1981 | Pohl et al. | 165/11 R |
| 4,577,977 | * | 3/1986 | Pejsa | 374/39 |
| 4,798,055 | * | 1/1989 | Murray et al. | 62/127 |
| 5,495,722 | * | 3/1996 | Manson et al. | 62/125 |
| 5,743,465 | * | 4/1998 | Jeong | 236/51 |
| 5,816,059 | * | 10/1998 | Ficchi, Jr. et al. | 62/127 |
| 5,850,209 | * | 12/1998 | Lemke et al. | 345/156 |
| 5,884,202 | * | 3/1999 | Arjomand | 701/29 |

OTHER PUBLICATIONS

Instalaltion Instructions: Accessory HSIO Display Module Package, pp. 1–8, Carrier Corp., 1992.

Installation Instructions: Remote Enhanced Display Accessory, pp. 1–4, Carrier Corp., 1996.

Controls—RTAA Air–Cooled Chiller Product Data, pp. 47–52, The Trane Company.

Typical Wiring Diagram—RTAA Air–Cooled Product Data, pp. 58–59, The Trane Company.

* cited by examiner

Primary Examiner—William Doerrler
Assistant Examiner—Marc Norman
(74) Attorney, Agent, or Firm—Wall Marjama & Bilinski (57) ABSTRACT

A portable, preferably hand held control module for use in a heating, ventilating or cooling (HVAC) system that includes at least one subsystem that may be controlled via a service module which is located in proximity to that subsystem. The portable control module includes a plurality of manually operated keys for enabling a user to apply to the subsystem commands which are generally the same as commands which may be applied via the manually operable keys of the service module. The portable control module also includes a display assembly having one or more displays for displaying to the user information concerning the subsystem that is generally the same as that which is displayed on the display assembly of the service module. Finally the portable control module includes a coupling assembly which allows it to be detachably connected to the subsystem, or to a local area network (LEN) which services the subsystem, to enable the user to apply commands to and receive information from the subsystem without being in proximity to the service module.

20 Claims, 5 Drawing Sheets

PORTABLE PLUG-IN CONTROL MODULE FOR USE WITH THE SERVICE MODULES OF HVAC SYSTEMS

BACKGROUND OF THE INVENTION

The present invention relates to heating, ventilating, or air conditioning (HVAC) systems, and is directed more particularly to a portable control module that may be detachably connected in testing and control relationship to at least one of the subsystems of an HVAC system.

A commercial HVAC system typically includes a number of component systems or subsystems, such as chillers, which are constructed as discrete modular units, but which are controlled in such a way that they operate as cooperating portions of the system as a whole. The desired cooperation is usually achieved by connecting the subsystems together via a local equipment network or LEN. The system as a whole may then be monitored and controlled, from a central location, by using the LEN to receive operational and status information from the subsystems, and to send command and control information thereto.

In order to facilitate the troubleshooting and repair of the subsystems connected to a LEN, the subsystems are provided with local control units, which are often referred to as service modules or service ports. These service modules have control panels which include manually operable keys and displays that enable a service person to assume and exercise local control over the associated subsystems. The manually operable keys and displays may, for example, enable the service person to examine and/or change the setpoints of operating variables, such as pressure or temperature, to determine and/or change the currently selected operating mode or alarm settings, to initiate test sequences, etc. Because subsystems are often located at places where they exposed to the open air, the service modules thereof are usually provided with weatherproof housings that are securely attached to some part of the subsystem.

Because a subsystem, such as a chiller, is often much larger than the human being which services it, the service module thereof is preferably mounted on a part of the subsystem that is selected to enable the service person to observe the operation of as many of the moving parts thereof as is physically possible. Unfortunately, even the most carefully selected mounting location may be one that prevents the service person from seeing the operation of the very part that he wants to test. The service person was then faced with the problem of choosing between being able to initiate a test without being able to see the part to be tested, and being able to see the part to be tested without being able to initiate the test.

Prior to the present invention, the above-described problem was dealt with in one of two ways. One of these was to provide the service person with a second service person or helper, and to divide the task of servicing the subsystem between the two. This solved the problem, but significantly reduced the productivity of the servicing process. It also created a risk that mistakes or misunderstandings on the part of one of the service persons might result in injury to the other.

Another way of solving the problem was to provide each subsystem with a multiplicity of alternately usable service modules. This too solved the problem, but significantly increased the cost and complexity of each subsystem. It also decreased the reliability of the system as a whole by increasing the number of ways in which its subsystems could fail.

In view of the foregoing, it will be seen that, prior to the present invention, there has existed a need for an apparatus which could be used to facilitate the performance of the test and control functions of the service module of an HVAC system, and which could be used without decreasing either the productivity of those who service that system, or the reliability of the system as a whole.

SUMMARY OF THE INVENTION

In accordance with the present invention, there is provided an apparatus which facilitates the performance of the test and control functions of the service module of an HVAC system, and which can be used without decreasing either the productivity of those who service that system, or the reliability of that system as a whole.

Generally speaking, the present invention comprises a portable, preferably hand held, control module that includes a multi-conductor flexible cable and connector plug through which the control module may be detachably connected to one or more of the subsystems of an HVAC system. The connection is preferably established as the connector plug engages a mating receptacle that is included in the service module of the subsystem with which the control module is used, or in one or more other, satellite receptacles that are positioned at various other locations in or near that subsystem. When plugged into the receptacle of the service module, or into one of its satellite receptacles, the portable control module enables a service person to perform any operation that the service person could perform with the service module. As a result, a service person who is equipped with the portable control module of the invention may walk around and observe all parts of the subsystem without giving up any of the testing and control capabilities which he had while standing at the service module, and without having the assistance of a helper.

In accordance with the present invention, the portable control module is designed so that it may be used in the same way as the corresponding service module. In preferred embodiments the service module and the control module are both designed to operate in accordance with a multi-level menu structure, and to enable a user to select the desired mode and level of operation within this menu structure using a weatherproof control panel which includes a relatively small number of displays and manually operable keys.

In the preferred embodiment, the control panel of the portable control module includes two or more different types of displays. A first of these displays comprises a discrete, non-alphanumeric display, which may take the form of an array or row of LEDs. This display, referred to herein as a mode or mode-indicating display, provides the user with a continuous indication of the mode in which the control module is operating. A second of these displays comprises an alphanumeric display, which may take the form of a multi-line LCD display. This display, referred to herein as a data display, provides the user with plain text messages and with the names and magnitudes or states of the variables of interest at the then selected level of the menu structure of the control module. The use of both of these different types of displays is advantageous because it enables the user to sequence through and examine different levels and types of specific information about various parts of the subsystem while at the same time having available a continuous, high level indication of the part of its menu structure within which the control module is operating.

The control panel of the portable control module of the invention also preferably includes a keypad that includes a relatively small number of manually operable keys, such as four, none of which are of the alphanumeric type, and all of which are large enough to be conveniently operated by a service person who is wearing gloves. These manually operable keys preferably include only keys that will hereinafter be described as Up, Down, Enter and Escape keys. When used in conjunction with the above-discussed displays and menu structure, this relatively small number of keys allows a user to sequence or step through all of the functions necessary to fully test and control even complex HVAC systems.

Other objects and advantages of the invention will be apparent from the following description and drawings, in which:

DESCRIPTION OF THE PREFERRED EMBODIMENTS

Figures 1, 1A:
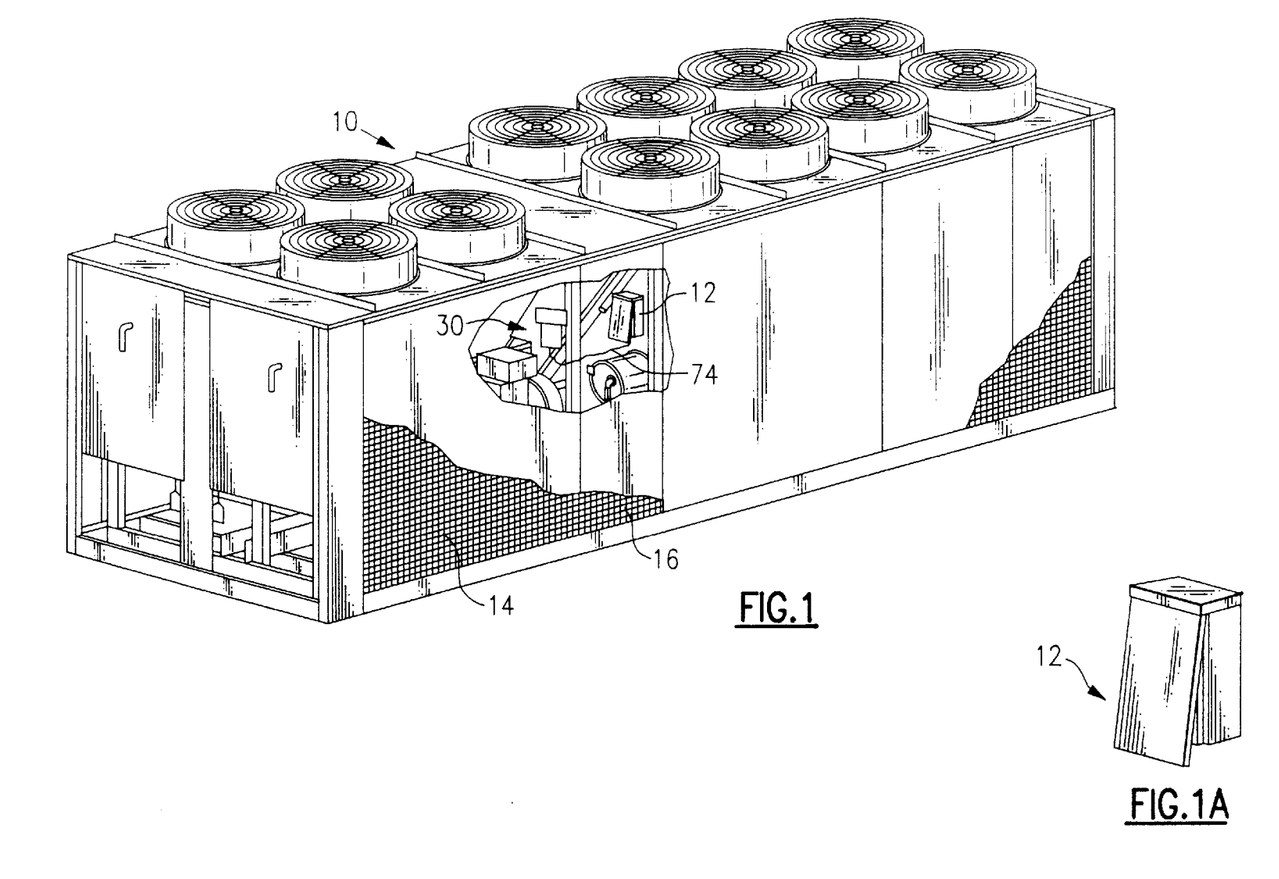
FIG. 1 is a simplified, partially cutaway oblique view of a chiller of a type that may be used with the portable control module of the present invention.

Referring to FIG. 1, there is shown an oblique, partially cutaway view of a chiller 10 of the type that may be used in a large commercial HVAC system, not shown. Chiller 10 may be an air-cooled reciprocating chiller of the 30 GT series sold by Carrier Corp., and serves to chill water pumped therethrough. Since chillers, such as chiller 10, are known to those skilled in the art, the structure and operation thereof will be discussed herein only as and to the extent necessary to shed light on the nature and operation of the portable hand held control module of the invention.

Chiller 10 is ordinarily connected to and controlled by a centrally located system control unit, not shown, via the conductors 72 of a Local Equipment Network or LEN. Chiller 10 can also, however, be controlled via a local control unit, which is referred to herein as a service module or port, and which is mounted thereon or in close proximity thereto. The service module of chiller 10 cannot be seen in FIG. 1 because it is obscured by the weatherproof enclosure 12 within which is located, but can be seen in FIG. 4 where a block diagram thereof is labeled with the number 20. The use of a weatherproof enclosure, such as enclosure 12, is necessary because, in spite of the fact that the sides of the chiller are covered by side panels, such as 14 and 16 in FIG. 1, these side panels include wire grilles which allow the interior of the chiller to be exposed to the open air. Enclosure 12 will be understood to be conventional except as specifically otherwise indicated herein.

Figure 2:
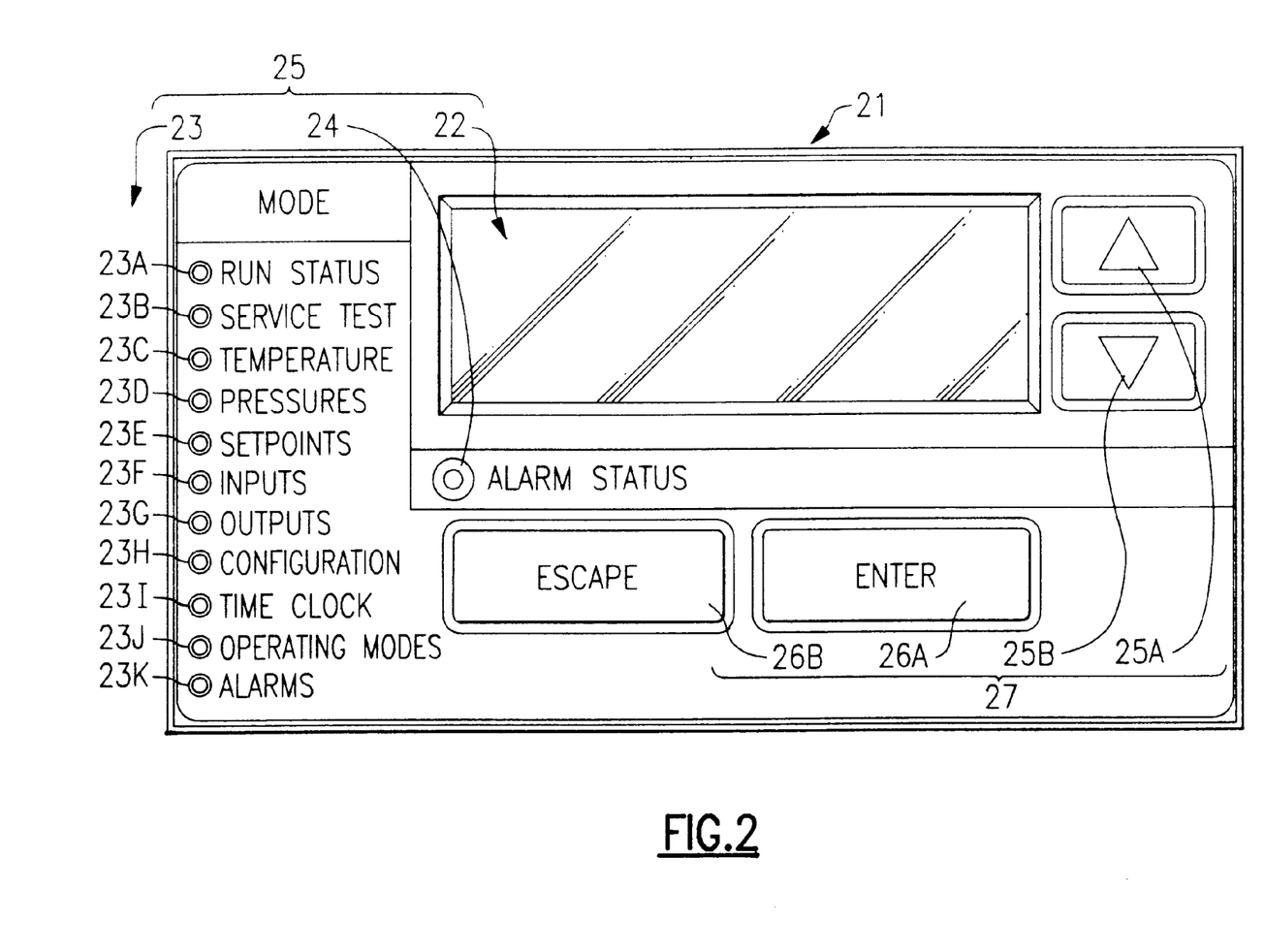
FIG. 2 is a front view of a control panel of a type that may used in the service module of FIG. 1.
Figure 4:
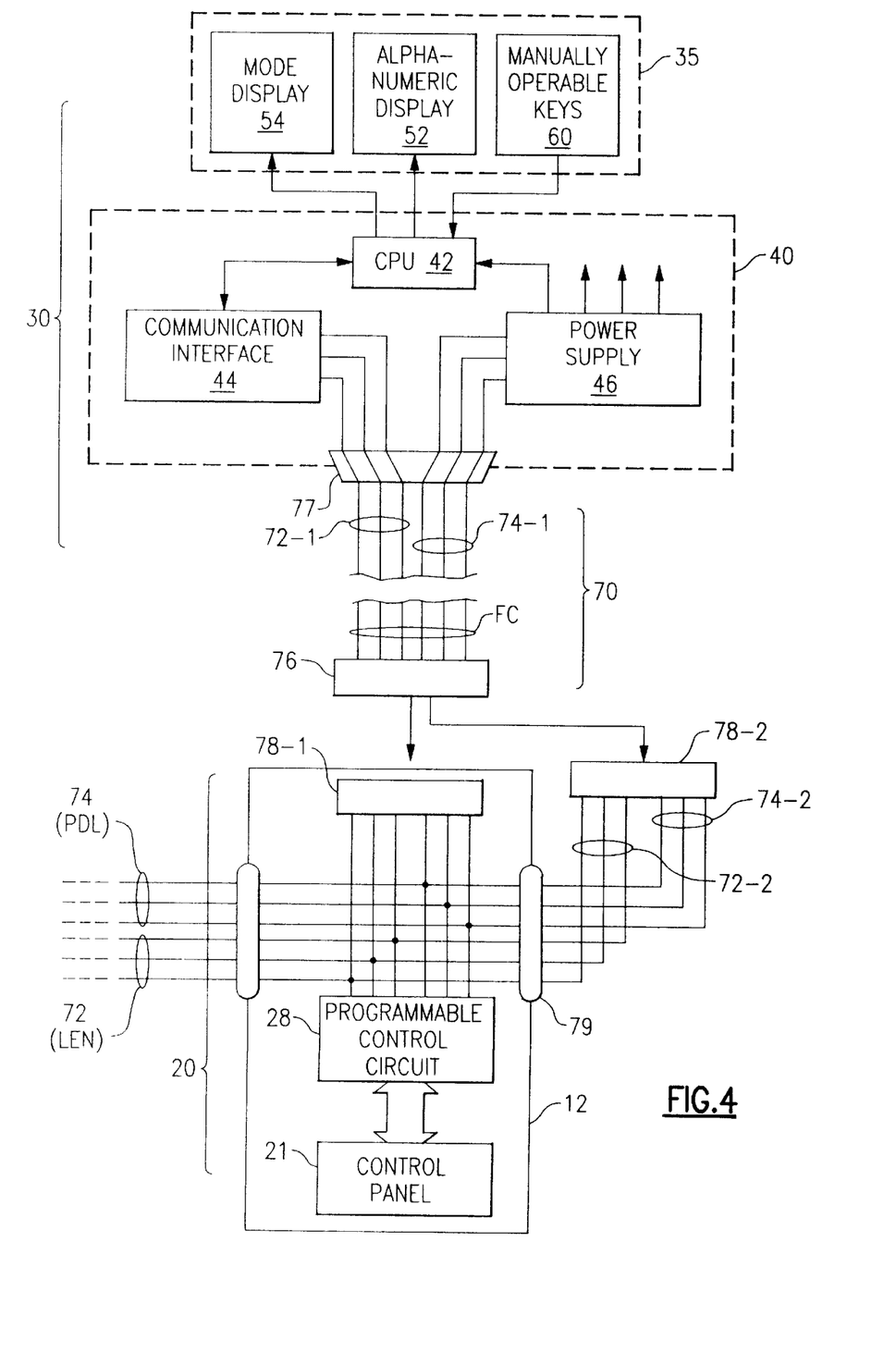
FIG. 4 is a block diagram of the control module of FIG. 3, shown with the plug and receptacles which connect it to the power and signal conductors with which it is used.

Service module 20 includes a control panel 21, which is most clearly shown in FIG. 2, and microprocessor-based programmable control circuit 28, which is most clearly shown in FIG. 4. As shown in FIG. 2, control panel 21 includes a display assembly 25 which in turn includes alphanumeric and mode displays 22 and 23, respectively, that provide service personnel with mode, status, setpoint and other information relating to chiller 10. Display assembly 25 may also include an "Alarm Status" display 24, which comprises a single illuminatable LED. The nature and purpose of these displays will be described more fully later in connection with a description of the corresponding displays of the portable control module of the invention. Control panel 21 also includes a keypad 27 which includes a plurality of manually operable keys 25A through 26B that allow service personnel to manually apply to chiller 10 via control circuit 28 commands, such as status commands, mode commands, and setpoint change commands which are useful in servicing and controlling chiller 10. The nature and purpose of these keys will also be described more fully later in connection with a description of the corresponding keypad and keys of the portable control module of the invention.

Prior to the present invention, a service person who was using a service module had to stand within reach of the control panel thereof. Because chillers are often much larger than the human beings who service them, a service person was often unable to both remain within reach of the control panel of the service module and observe operation of the part of the chiller in which he was interested. As a result, he often had to secure the assistance of a helper or improvise a way of working around this difficulty. Both of these choices had the effect of reducing the overall efficiency and productivity of the servicing process.

Figure 3:
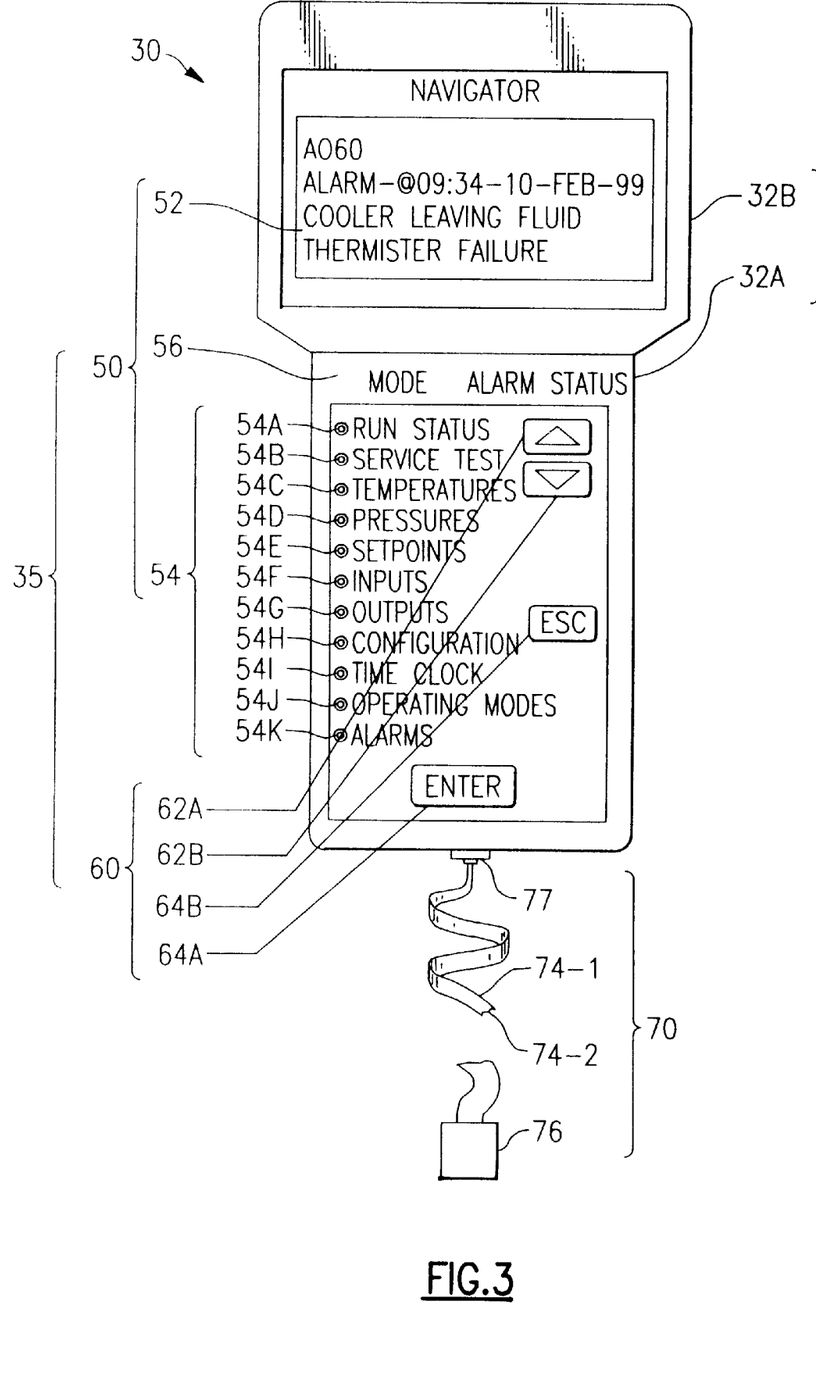
FIG. 3 is a front view of one embodiment of a portable control module that has been constructed in accordance with the present invention.

In accordance with the present invention, the above-described problem is solved by providing a portable, preferably hand held, control module 30, best shown in FIG. 3, which includes a control panel and programmable control circuitry of the same type used in service module 20, and is provided with a flexible multi-conductor cable and plug that, when plugged into a mating receptacle in or near the service module, allows a service person to initiate, via the portable control module, any action that he could initiate via the service module. This allows the service person to position himself at considerable distances from the service module without giving up the ability to take advantage of the capabilities thereof. This not only enables the service person to more effectively and efficiently test and service the subsystem on which he is working, but can also increases his productivity by eliminating the need for a helper. As will be explained more fully later, each subsystem of the HVAC system may include as many receptacles as is necessary to allow service personnel to take the fullest possible advantage of the portable control module of the invention.

The portable control module of the invention will now be described with reference to FIGS. 3–5. Referring to FIG. 3 there is shown the preferred embodiment of a portable control module 30 constructed in accordance with the present invention. Control module 30 includes a housing 32 which has a first, lower section 32A that is small enough to be held in a human hand, and a second, larger, upper section 34B. Upper housing section 32B supports a multi-line, multi-character (e.g. 4 line by 20 character) alphanumeric display 52, which preferably comprises a liquid crystal display of the type that includes a temperature compensating back-light in order to ensure that data presented thereon may be read both under dim indoor lighting conditions and under bright outdoor lighting conditions. In accordance with one feature of the present invention, display 52 is arranged to present to a user a variety of different kinds of specific information which may include one or more of (a) plain language operational and diagnostic information about the operation of chiller 10 as a whole, or any of its component parts, (b) the identities and magnitudes of variables or their setpoints, and (c) the identities, statuses and setpoints of alarms, among many others. Alphanumeric display 52 will also be referred to herein as a data display because its function is to display multi-character blocks of data, as opposed to mere on/off state information.

Again referring to FIG. 3, lower housing section 32A of portable control module 30 includes a mode display 54. Display 54 preferably comprises an array or row of illuminatable off/on indicators, which here take the form of LEDs 54A through 54K. These LEDs are illuminated when respective ones of the high level options of the menu structure of the control module are selected, thereby providing a user with a continuous high-level indication of the mode in which the control module is operating. Since the menu structure may have numerous branches, each of which has multiple levels, and multiple options at each level, knowing the major branch within which the control module is operating helps the user to keep track of where within its menu structure the control module is operating and, therefore, how to most quickly change it to the mode and level where he next wishes it to operate.

Lower housing section 32A also preferably includes an "Alarm Status" display which comprises an illuminatable indicator 56 such as an LED. Indicator 56 is preferably in its off state when the chiller is operating normally. When the chiller is not operating normally, indicator 56 is made to blink on and off or to assume a continuously on state, depending upon the severity of the abnormal condition. In the preferred embodiment, the control module is programmed so that the blinking state indicates an operating condition which is unusual, but which is not severe enough to require that the chiller be shut down, and so that a continuously illuminated state indicates a condition was serious enough that the chiller had to be shut down. The preferred embodiment is also preferably programmed so that, under the latter condition, the user may select the "Alarms" mode (LED 54K) and review the last twenty alarm messages produced by the chiller. Thus, indicator 56 comprises a high level display which allows a user to determine at a glance whether the chiller is or is not operating normally and, if it is not operating normally, how severe the abnormal condition is.

Above-described displays 52, 54, and 56, hereinafter referred to collectively as display assembly 50, represent only one particularly advantageous way of implementing the display of the portable control module of the invention. It will therefore be understood that, except where otherwise specifically indicated, the display of the present invention is not limited to any particular types or numbers of display elements, or to a display which has any particular physical arrangement or which is divided up into any particular number of component displays.

Still referring to FIG. 3, lower housing section 32A of portable control module 30 also includes a set of manually operable keys or keypad 60 for enabling a user to move to and select any desired one of the options made available by the menu structure thereof, and to select or change the magnitudes of system variables. These keys preferably have a size and spacing such that a user may operate them while wearing gloves, and are covered by a flexible protective layer that renders them weatherproof. In the preferred embodiment, these keys include up and down keys 62A and 62B, respectively, an enter key 64A and an escape key 64B. The manner in which these keys are used will be described later in connection with FIG. 5. As in the case of display 50, however, the keypad of the present invention is not limited to any particular types or numbers of keys, or to a keypad which has any particular physical arrangement or which is divided up into any particular number of component keypads.

If displays 52, 54, and 56 of the portable control module 30 of FIG. 3 are compared to displays 22, 23 and 24, respectively, of the service module, it will be seen that there is a one-to-one correspondence therebetween. Similarly, if the keys 62A through 64B of the portable control module of FIG. 3 are compared to keys 25A through 26B, respectively, of the service module, it will be seen that there is also a one-to-one correspondence therebetween. These one-to-one correspondences are advantageous because they allow a user to use the portable control module and the service module in exactly the same way and, therefore, to use them alternatively and interchangeably without creating a risk of confusion. Thus, in spite of the fact that the displays and keys of the portable control module do not have the same physical arrangement a those of the service module, they are operationally and functionally the same as those of the service module. As a result, the displays and keys of the portable control module of FIG. 3 may properly regarded as together defining a control panel 35 that is the operational and functional equivalent of control panel 21 of FIG. 2.

Although portable control module is designed to be held in a human hand, it is not always convenient to use it while holding it in this way. Accordingly, the rear portion of the housing of the portable control module is preferably provided with a permanent magnet (not shown) that makes it possible for the user to temporarily secure the control module to any convenient magnetically permeable part of the subsystem with which it is being used, thereby freeing one or both of the hands of the person using it.

Referring to FIG. 4, there is shown a block diagram of the internal circuitry of portable control module 30. In addition to the displays and keys described in connection with control panel 35 of FIG. 3, this internal circuitry comprises a programmable control circuit 40 which includes a central processing unit (CPU) 42, a communications interface network 44, and a power supply 46. CPU 42 controls the overall operation of portable control module 30 in accordance with a stored program that is the same as that used by the corresponding CPU (not shown) of service module 20. Communication interface network 44 is provided to assure that information can be transmitted bidirectionally between control module 30 and the conductors 72 of the LEN in a form that meets the format and protocol requirements thereof. Power supply 46 is provided to receive operating power from the conductors 74 of a power distribution line (PDL) and to supply, to each part of control module 30, voltages and currents that meet the power requirements thereof. Aside from the menu structure used therein, and the manner in which this menu structure is used, both of which will be described in connection with FIGS. 3 and 5, the circuits and programs that are used in control module 30 are of types that are known to those skilled in the art. Accordingly, the structure and operation of these circuits and programs will not be further discussed herein.

In accordance with an important feature of the present invention, portable control module 30 is provided with a flexible coupling assembly 70 which may be used to detachably connect it, in control relationship to the chiller, preferably via service module 20. In the embodiment of FIG. 4, coupling assembly 70 includes a multi-conductor flexible cable FC. The latter cable may include three conductors, collectively designated 72-1, which carry signal information bi-directionally among and between the control module, the service module and the LEN, and which may take the form of a twisted pair surrounded by a shield. Flexible cable FC may also include three conductors, collectively designated 74-1, which supply operating power to control module 30 from the conductors 74 of power distribution line PDL. These conductors may include two power conductors and a neutral conductor. Since the configurations and physical structures of these conductors are not critical features of the present invention, they will not be described in detail herein.

In order for control module 30 to be used under all weather conditions, there must be no part or seam thereof through which water can pass and come into contact with the circuitry or wiring thereof. As a result, in the preferred embodiment of the invention, the inner or proximal end of flexible cable FC is secured to the lower portion of housing 32A by means of a suitable weatherproof seal or grommet-like member 77. It will be understood that all known types of such seals or members are within the contemplation of the present invention.

In order that flexible cable FC may be detachably connected to and from service module 20, the outer or distal end thereof is provided with a multi-contact connector plug 76, which is preferably, but not necessarily of the type sold under the designation RJ11. This plug is adapted to be plugged into a mating RJ11 receptacle 78-1, which is secured to a suitable location on the service module. To the end that control module 30 may be used under adverse weather conditions, receptacle 78-1 of service module 20 may be located inside of weatherproof housing 12, as shown in FIG. 4. If receptacle 78-1 is located inside of this housing, the cover thereof must be open when the portable control module is being used. Alternatively, a receptacle such as receptacle 78-1 may be mounted on housing 12 itself, if the latter is provided with a suitable weatherproof cover member (not shown) that can be closed to protect the interior of the service module when no portable control module is connected thereto.

Additional receptacles, herein referred to as satellite receptacles, may be provided at other suitable locations around the periphery of Chiller 10. Including such satellite receptacles is advantageous because they allow a service person to test, monitor and control the chiller from any convenient point on the periphery thereof, without using a flexible cable that is too long to be easily handled. One such satellite receptacle 78-2 is shown in FIG. 4. Such satellite receptacles may be connected to the service module, the LEN and the power distribution cable via respective sets of conductors, such as 72-2 and 74-2 of FIG. 4. If the conductors of the satellite receptacle actually enter housing 12, the latter should be provided with a seal or grommet-like member, indicated in FIG. 4 by the numeral 79, which is similar to that described above in connection with seal 77 and which is sufficient to maintain the weatherproof character thereof. Satellite receptacles may also be connected directly to the conductors of the LEN and PDL, without being routed back to the service module. It will be understood that many combinations of such variant connections are possible, and that all such combinations are within the contemplation of the present invention.

Figure 5:
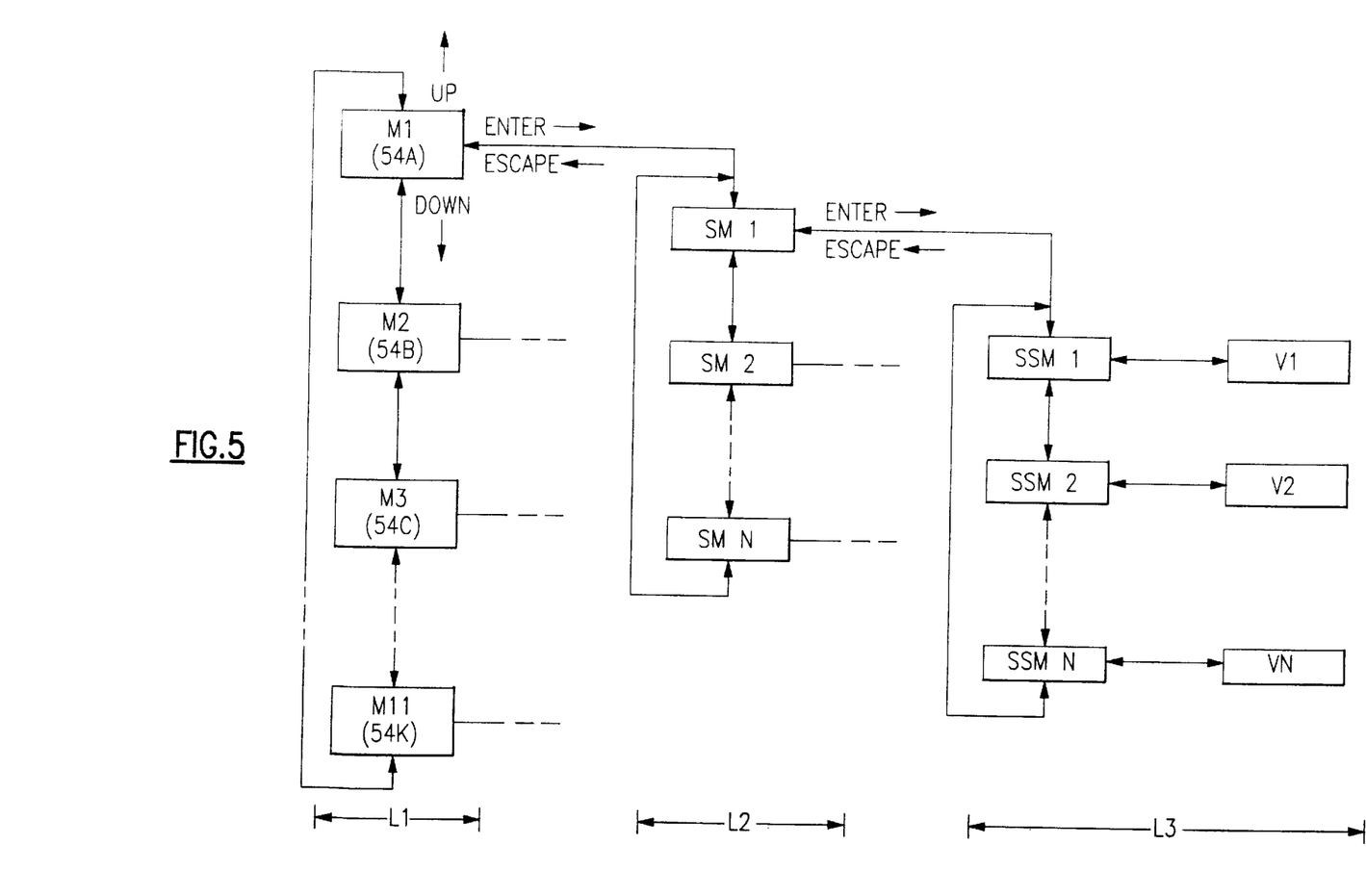
FIG. 5 shows a part of a multi-level menu structure of the type that may be used in the portable control module of the invention.

The manner in which the displays and keys of the portable control module of the invention are used will now be summarized with reference to FIGS. 3 and 5. When the connector plug 76 of portable control module 30 is inserted into mating receptacle 78-1 of service module 20, or one of its satellite receptacles, the control module powers up and begins operating in one of the modes indicated by the mode names that are shown adjacent to LEDs 54A through 54K of FIG. 3. The mode in which the control module operates is the mode whose name appears adjacent to the illuminated LED. While the mode in which the control module starts, i.e., the default mode, may be any one of the modes that correspond to the LEDs of mode display 54, the preferred embodiment uses the "Run Status" mode as the default mode, and starts with LED 54A illuminated. This mode is selected because it is designed to enable a user to obtain quick access to the most frequently needed lower level modes, herein referred to as "submodes", which provide an overview of the status of the major parts of the chiller.

Operation in the default or "Run Status" mode corresponds to operation at the highest level of the menu structure of the control module, a simplified representation of which is shown in FIG. 5. In the latter Figure, this highest level is labeled L1, and defined by the blocks which are included therein, in the present example blocks M1 through M11. Each of these blocks corresponds to one of the modes whose names appear adjacent to respective LEDs of display 54, and will therefore be referred to herein as "mode blocks". For the sake of clarity, the numbers of these LEDs that are associated with mode blocks M1 through M11 are shown in parentheses therein. Naturally, there are many possible combinations of numbers and types of modes which may be included in level L1 of the menu structure of FIG. 5. It will therefore be understood that the present invention is not limited to any particular one of these combinations.

Once the portable control module is operating in Run Status mode M1, the user has the option of scrolling through the remaining modes of level L1 of the menu structure. If he chooses to do so, he may scroll upwardly or downwardly through the remaining modes of level L1 by pressing either up key 62A or down key 62B thereof, respectively. Which of these scrolling directions he chooses is a matter of convenience, since the modes of level L1 bear a wrap-around relationship to one another. As the user scrolls through these modes, alphanumeric display 52 may (and preferably does) remain blank since, under the subject condition, mode display 54 provides the user with all the information he needs in order to decide how best to proceed. If the user wants more specific information about the mode he has selected, he may do so by pressing enter key 64A and thereby causing the control module to advance to the next lower level, L2, of the menu structure.

If the user presses enter key 64A and advances into lower level L2 of the menu structure, the control module will enter one of the submodes which are associated with that level. While each of the modes of level L1 has associated therewith a plurality of submodes, only the submodes, SM1 through SMN, which are associated with mode M1 are shown in FIG. 5. The user may then scroll up or down through these submodes using the up and down keys. As these different submodes are selected, alphanumeric display 52 displays information about that submode that is designed to enable the user to decide what to do next. The user then has the option of returning to the previously selected level by pressing escape key 64B, or of obtaining more information about the currently selected submode by pressing enter key 64A and thereby causing the control module to advancing into the next lower level, L3, of the menu structure. As in the case of level L1, there are many possible combinations of numbers and types of submodes which may be included in the various parts of level L2 of the menu structure. It will be understood that the present invention is not limited to any particular ones of such combinations.

Once level L3 has been entered, the user may scroll through any of the options that are available at that level.

Level L3, like level L2 may include a plurality of component modes, herein referred to as subsubmodes. For the sake of clarity, however, FIG. 5 shows only those of these subsubmodes, SSM1 through SSMN, that are associated with submode SM1 of level L2. While there is no limit, in principle, to the number of levels that may be included in the menu structure of the control module, the preferred embodiment thereof stops at level L3. This is because, by the time that level L3 is reached, the control module is operating at a level at which it is able to display on alphanumeric display 52 blocks of information that are specific enough to enable the user to make a final decision as to what action, if any, is called for. Such blocks of information, which are shown in FIG. 5 as the blocks labeled V1 through VN, may include the names and conditions of individual components, the names and magnitudes of individual operating variables of the chiller, such as particular temperatures and/or particular temperature setpoints, particular pressures and/or particular pressure setpoints, and alarm setpoints, among others, along with appropriate text-based failure or diagnostic messages. As in the case of levels L1 and L2, there are many possible combinations of numbers and types of subsubmodes which may be included in the various parts of level L3 of the menu structure. It will be understood that the present invention is not limited to any particular ones of such combinations.

If the control module is operating on level 3 of the menu structure and the user determines that no action is called for, he may return to higher levels of the menu structure by pressing the escape key one or more times. If action is called for, the control module is arranged to interpret a further pressing of the enter key as a request that the value of a displayed variable be changed. After this is done, the user may use the up and down keys to increase or decrease the value of the displayed variable as necessary. By then pressing the enter key again, the user causes the control module to accept the changed value as the desired final value. Once this has been done, the user may return to the higher levels of the menu structure by pressing these escape key one or more times.

As the user returns to the higher levels of the menu structure, he may stop at any desired level, select any of the options or modes that are available at that level, and then return to the parts of the lowest level of the menu structure that are associated therewith to make further tests or make any further changes. This ascent and descent through the menu structure may repeated as many times as necessary until the user is satisfied that he has done all that he wishes to do with the control module connected to the receptacle to which it is then connected. He may then unplug the control module, move it to and plug it into any desired one of the remaining receptacles, as necessary, until he has completed his testing and servicing the HVAC system as a whole.

In view of the foregoing, it will be seen that the present invention comprises a control module which is small enough to be conveniently held in a human hand, which includes a flexible coupling structure that allows it to be plugged in and used at any desired number of convenient points around the HVAC system with which it is used, and yet which provides a menu structure that enables its user to quickly and easily determine whether the system is operating as it should and, if it is not, what action should be taken to make it operate as it should.

While the control module of the present invention has been described in terms of a single preferred embodiment, it will be understood that the true spirit and scope of the present invention should be determined only with reference to the following claims.

What is claimed is:

1. A portable control module for use in a heating, ventilating or cooling (HVAC) system which includes at least one subsystem that may be controlled via a service module which is located in proximity to that subsystem, said service module being of the type which includes (i) a plurality of manually operable keys for enabling a user to apply to said subsystem commands including at least one of status commands, test commands, mode commands, and setpoint change commands, and (ii) a display assembly for displaying information received from said subsystem in response to the operation of the keys of said service module, said portable control module including, in combination:

(a.) a portable housing;
(b.) a plurality of manually operable keys for enabling the user to apply to said subsystem commands which are substantially the same as the commands which may be applied to said subsystem via the manually operable keys of said service module;
(c.) a display assembly for displaying to the user, in response to the operation of the manually operable keys of said control module, information concerning said subsystem which is substantially the same as that which is displayed on the display assembly of said service module in response to the operation of the corresponding keys of said service module; and
(d.) coupling means attached to said portable housing for detachably connecting said portable control module to said subsystem to enable the user to apply commands to said subsystem and to receive information from said subsystem without being in proximity to said service module.

2. The portable control module of claim 1 in which said coupling means includes a connector plug and a plurality of electrical conductors for connecting said control module to said connector plug, in which at least one of said service module and said subsystem includes a receptacle adapted to receive said connector plug, and in which the plugging of said connector plug into said receptacle enables the user to apply said commands to said subsystem by using either the manually operable keys of said service module or the manually operable keys of said control module, and to receive, via either the display assembly of said service module or the display assembly of said control module, substantially the same information concerning said subsystem.

3. The portable control module of claim 1 in which said manually operable keys have sizes and spacings which allow said keys to be operated by a user who is wearing protective gloves.

4. The portable control module of claim 3 in which said plurality of keys and said at least one display are covered by a transparent weatherproof cover, and in which each of said manually operable keys may be operated through said weatherproof cover.

5. The portable control module of claim 1, further including a magnet secured to said portable housing, for detachably securing the control module to a magnetically permeable part of said subsystem, and thereby allowing the user to service the subsystem without holding the control module in his hands.

6. The portable control module of claim 1 further including (i) processing means including a stored program for processing commands entered via said plurality of keys and for controlling the displaying of information on said display assembly, (ii) a plurality of electrical conductors for connecting said processing means to said plurality of keys and to said display assembly, and (iii) interfacing means for interfacing said processing means with said coupling means to enable said control module and said subsystem to communicate with one another via said coupling means, said stored program defining a multi-level menu structure that enables the user to use said keys and said display assembly to determine the operative status of a plurality of the parts of said subsystem.

7. The portable control module of claim 6 in which said manually operable keys include at least an up key and a down key for enabling the service person to scrollably select that one of a plurality of operating modes in which the control module is to operate, an enter key for causing the control module to move to a deeper level of said menu structure, and an escape key for causing the control module to move to a higher level of said menu structure.

8. The portable control module of claim 6 in which said display assembly includes at least a mode display for indicating the mode in which the control module is operating, and an alphanumeric display for displaying information about the subsystem which is dependent on the part of said menu structure within the control module is operating.

9. The portable control module of claim 7 in which said display assembly includes at least a mode display for indicating the mode in which the control module is operating, and an alphanumeric display for displaying information about the subsystem which is dependent on the part of said menu structure within which the control module is operating.

10. The portable control module of claim 8 in which said display assembly further includes an alarm status display for indicating to the user the existence and severity of an abnormal operating condition in said subsystem.

11. In a heating, ventilating or cooling (HVAC) system of the type which includes a plurality of subsystems that may be controlled via the conductors of a local equipment network (LEN), and at least one service module located in proximity to a respective subsystem and connected to said LEN for enabling a user to exert local control over that respective subsystem, said service module being of the type which includes (i) a plurality of manually operable keys for enabling the user to apply to the respective subsystem commands including at least one of status commands, mode commands, and setpoint change commands, and (ii) a display assembly for displaying information received from said subsystem in response to the operation of the keys of said service module, the improvement comprising:

at least one receptacle, connected to said LEN, for receiving a plug which includes conductors that correspond to at least the conductors of said LEN;

a portable control module including:
(a.) a plurality of manually operable keys which correspond to the manually operable keys of said service module;
(b.) a display assembly for displaying to the user, in response to the operation of the manually operable keys of said control module, information concerning said subsystem which is substantially the same as that which is displayed on the display assembly of said service module in response to the operation of the corresponding keys of said service module; and
(c.) coupling means for detachably connecting said portable control module to said LEN to enable the user to apply commands to one of said subsystems, and to receive information from said one of said subsystems without being in proximity to the respective service module thereof, said coupling means including a plurality of conductors and a plug adapted to fit into said at least one receptacle;

whereby the user may use said control module and service module interchangeably to apply commands to and receive information from said one of said subsystems.

12. The portable control module of claim 11 in which said portable control module includes a weatherproof housing, further including means defining a weatherproof seal between said coupling means and said weatherproof housing.

13. The portable control module of claim 11 in which said manually operable keys have sizes and spacings which allow said keys to be operated by a user who is wearing protective gloves.

14. The portable control module of claim 11 in which said plurality of keys and said at least one display are covered by a transparent weatherproof cover, and in which each of said manually operable keys may be operated through said weatherproof cover.

15. The portable control module of claim 11, further including a magnet secured to said portable housing, for detachably securing the control module to a magnetically permeable part of said subsystem, and thereby allowing the user to service the subsystem without holding the control module in his hands.

16. The system of claim 11 in which said portable control module further includes (i) processing means including a stored program for processing commands entered via said plurality of keys and for controlling the displaying of information on said display assembly, (ii) a plurality of electrical conductors for connecting said processing means to said plurality of keys and to said display assembly, and (iii) interfacing means for interfacing said processing means with said coupling means to enable said control module and said one of said subsystems to communicate with one another via said coupling means, said stored program defining a multi-level menu structure that enables the user to use said keys and said display assembly to determine at least the operative status of predetermined parts of said one of said subsystems.

17. The portable control module of claim 16 in which said manually operable keys include at least an up key and a down key for enabling the service person to scrollably select that one of a plurality of operating modes in which the control module is to operate, an enter key for causing the control module to move to a deeper level of said menu structure, and an escape key for causing the control module to move to a higher level of said menu structure.

18. The portable control module of claim 16 in which said display assembly includes at least a mode display for indicating the mode in which the control module is operating, and an alphanumeric display for displaying information about the subsystem which is dependent on the part of said menu structure within the control module is operating.

19. The portable control module of claim 17 in which said display assembly includes at least a mode display for indicating the mode in which the control module is operating, and an alphanumeric display for displaying information about the subsystem which is dependent on the part of said menu structure within which the control module is operating.

20. The portable control module of claim 18 in which said display assembly further includes an alarm status display for indicating to the user the existence and severity of an abnormal operating condition in said subsystem.

* * * * *